United States Patent [19]

Svendsen

[11] 4,165,830

[45] Aug. 28, 1979

[54] CRAB POT WARP LINE COILER

[75] Inventor: Robert A. Svendsen, Seattle, Wash.

[73] Assignee: Marine Construction & Design Co., Seattle, Wash.

[21] Appl. No.: 929,302

[22] Filed: Jul. 31, 1978

Related U.S. Application Data

[63] Continuation-in-part of Ser. No. 821,531, Aug. 3, 1977.

[51] Int. Cl.² ............................................ B65H 17/22
[52] U.S. Cl. .................................................... 226/187
[58] Field of Search ............................ 242/47, 82, 83; 226/181, 186, 187; 254/175.5

[56] References Cited

U.S. PATENT DOCUMENTS

| | | | |
|---|---|---|---|
| 2,407,353 | 9/1946 | Wagner | 242/82 |
| 3,506,174 | 4/1970 | Shuey | 226/187 X |
| 3,717,325 | 2/1973 | Peterson | 242/83 X |
| 3,750,970 | 8/1973 | Tremoulet | 242/47 |

*Primary Examiner*—Richard A. Schacher
*Attorney, Agent, or Firm*—Christensen, O'Connor, Johnson & Kindness

[57] ABSTRACT

A crab pot warp line coiler is disclosed utilizing the unique properties of "Crab Lay" type synthetic line. Drawn by the coiler from a pot hauler, the line passes initially around an input guide sheave and thereupon downwardly across a vertical span into the nip between opposing guide rollers underlying the guide sheave. These feed the line directly down into the central part of a receiving enclosure serving to confine the coils which inherently form in a sufficiently orderly manner in the process without other guide means being required. The feed rollers, one comprising a pneumatic tire that runs in a peripheral groove about the other, are yieldably spring actuated toward each other so as to grip the line for feed purposes with a pressure that, by reason of the overlying location of the input sheave assuming horizontally directed incoming line tension load, is kept substantially independent of line load tension. Furthermore, the heavy and bulky knots securing together the successive shots of the dense Crab Lay line are enabled to pass through the feed rolls readily at the high hauling speeds employed without disrupting the continuous coiler action, nor causing excessive mechanical shock in the apparatus.

8 Claims, 5 Drawing Figures

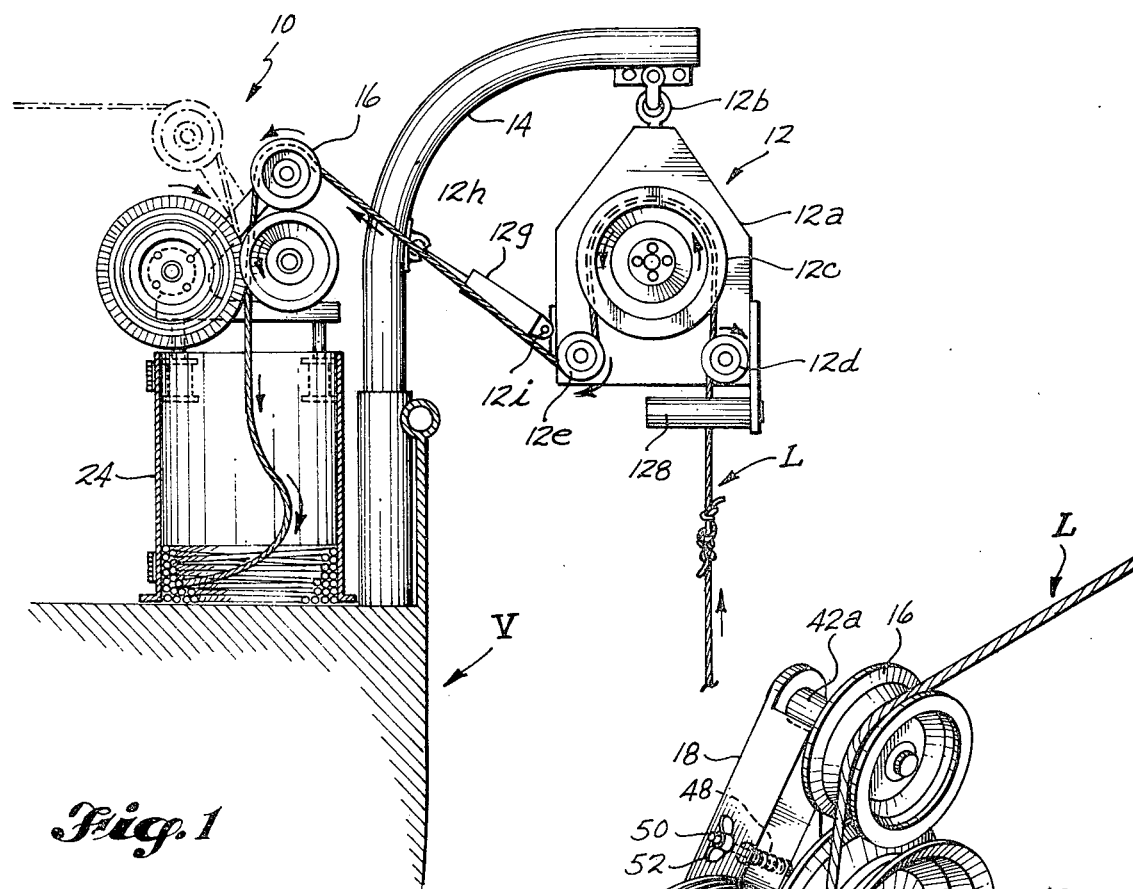
Fig. 1
Fig. 4A
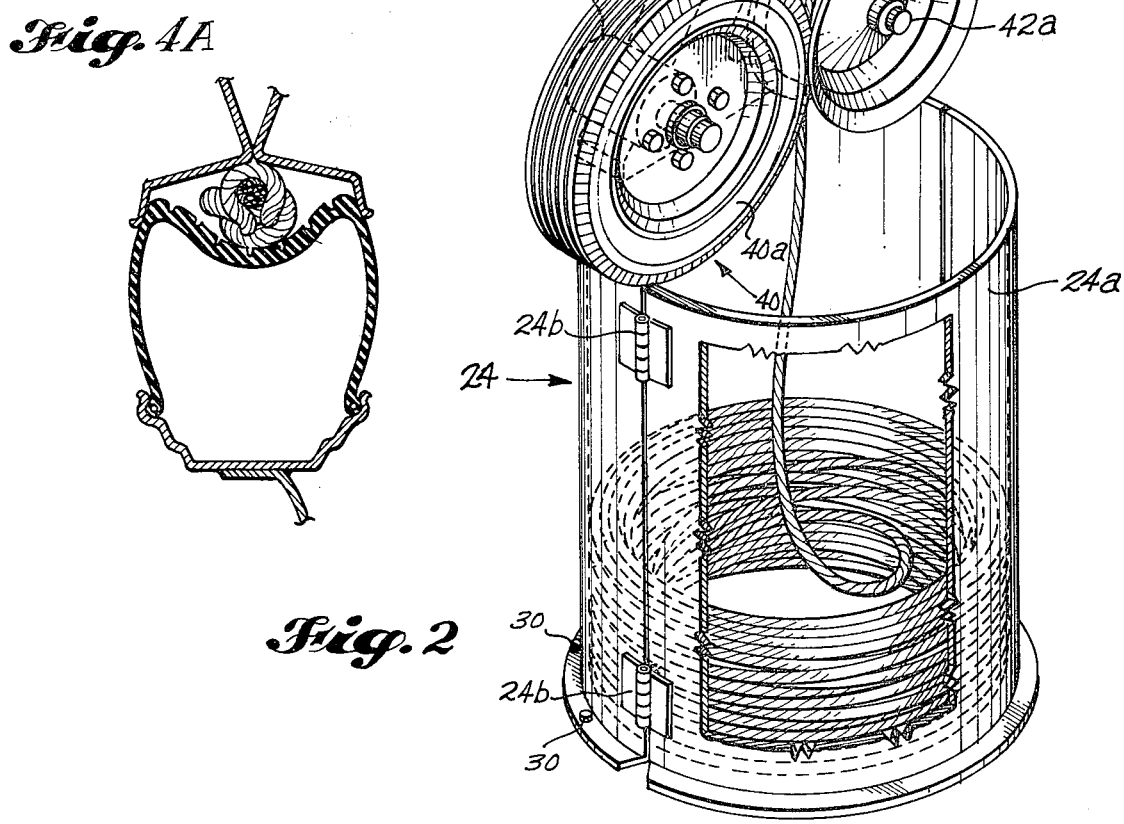
Fig. 2

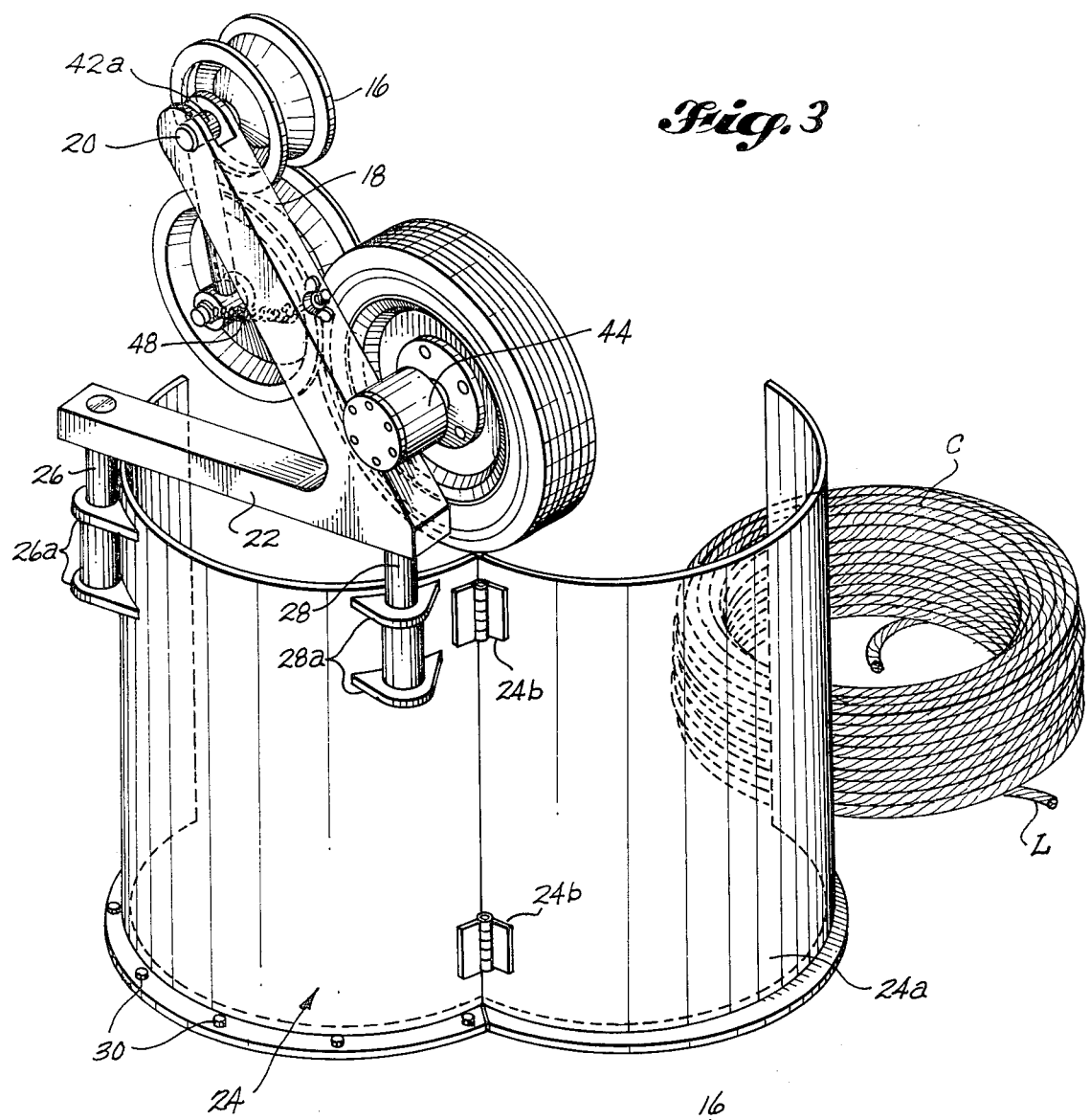
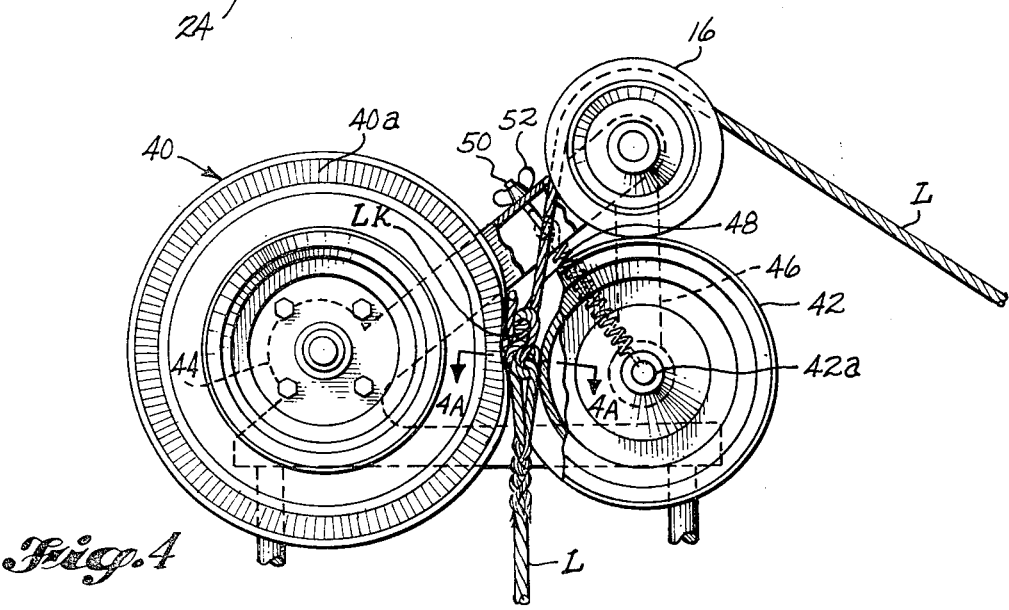

CRAB POT WARP LINE COILER

BACKGROUND OF THE INVENTION

This application is a continuation-in-part of Ser. No. 821,531, filed Aug. 3, 1977.

This invention relates to mechanized crab pot warp line haulers and coilers and more particularly to an improved automatic continuous coiler by which the heavy and hard nylon, polypropylene and polypropylene-dacron blend lines commonly referred to as "Crab Rope" or "Crab Lay" typically used in king crab fishing can be rapidly formed in orderly coils attending high-speed hauling of the pots. A broad object hereof is to devise a low-cost, mechanically simplified, safer and more reliable coiling device that takes up a minimum amount of deck space and is relatively durable and maintenance free. The invention is herein illustratively described in its presently preferred form; however, it will be recognized that certain modifications with respect to details may be made therein without departing from the essential features involved.

Typical crab pot warp lines are three-quarters of an inch in diameter and range in length from less than fifty fathoms to more than one hundred twenty fathoms. Differing lengths are formed by knotting together shorter lengths or "shots" of line. Each pot warp usually consists of a buoyant bottom section and a sinking top section. Buoyancy of the bottom section fastened to the pot is usually of polypropylene. Its positive buoyancy keeps the line from scraping on the ocean floor. Negative buoyancy of the top section nylon or polypropylen-dacron fastened to the marker buoy causes it to sink from the buoy and thus prevents its fouling with the ship's propellors and rudders during recovery of pots.

While the kind of line material used in the bottom section of the crab pot warp differs from that used in the top section in order to achieve the different buoyancy requirements mentioned above, each is known in the trade as "Crab Rope" or "Crab Lay." These terms denote line manufactured with a substantially greater than normal tightness of twist or weave, yielding a line density approximately ten percent greater than general-purpose line or rope of the same material. At the same time, this greater density produces much greater stiffness and hardness in the line. For example, a two-foot length of three-quarter inch Crab Lay held horizontally in the hand at one end will droop only about four inches at the remote end, whereas a two-foot length of three-quarter inch general-purpose rope or line of the same material will droop nearly to the full extent of its projecting length starting immediately adjacent the hand holding it. This test and the attendantly greater density of Crab Lay type line is intended herein to constitute a definitional distinction of the kind which, with equivalents, produce or represent the working condition to which the invention applies.

While the greatly increased stiffness of these hard and dense lay-up lines inherently increases the work involved in manipulating and arranging the long knotted lengths involved, such as in coiling, their other characteristics make them uniquely desirable for king crab fishing. These characteristics include greater strength, greater abrasion resistance and a reduced tendency to tangle and knot when drawn or fed rapidly from coils piled on the deck of the fishing vessel during making the sets. In addition, the increased form retentive stiffness of such Crab Lay has a further advantage. For example, when the hundreds of feet of coils stored in a trap or piled on deck are handled or subjected to the vessel's motion in heavy seas there is much less tendency for Crab Lay type line to become disarranged and knot-prone than it would if ordinary general-purpose line or rope is used.

Problems of coiling and arranging Crab Lay created by the great stiffness and density of the line are further complicated by the large size and stiffness (i.e., relative incompressibility) of knots tying the shots together. These problems must also be solved by suitable hauling apparatus and suitable coiling apparatus, such as in this invention.

One prior device for laying up hauled lines in open coils is disclosed in U.S. Pat. No. 3,750,970. In that case the line fed downwardly into the receiving barrel or tub was guided through a rotating deflection tube or slinger directing the line outwardly by centrifugal force so as to form a descending spiral to make up the accumulating coil. In varying degrees, the U.S. patents cited as of record in U.S. Pat. No. 3,750,970, are also of background interest, including primarily U.S. Pat. Nos. 3,270,979 and 2,407,353, as are U.S. Pat. Nos. 1,865,069; 2,407,353; 3,243,090; 3,506,174; and 3,717,325 cited in connection with examination of the parent patent application.

The present invention does away with rotating mechanical slingers and any other complicating mechanisms previously thought to be essential in crab pot line coilers. In performing its mechanical coiling operation the novel apparatus operates in smoothly continuous manner, replacing former vibration-producing slingers and the like by a simple and direct continuous roller feed system and associated enclosure to receive and coil the line. It was discovered for this purpose that pot warp lines such as Crab Lay of nylon, polypropylene or polypropylene-Dacron blend, thrust fed downwardly from a generally central position into a cylindrical coil former or enclosure by the roller means employed herein will assume a coiled configuration in the container of sufficient orderliness for practical purposes and that in performing this operation the apparatus accommodates also the heavy and bulky shot-connecting knots, even at the highest hauling rates used in this fishery.

Still another object of the invention is to provide a compact, safe and efficient continuous-operating line coiler that may be operatively associated with a primary hauler capable of hauling in crab pot lines of the type indicated at rates as high as several hundred feet per minute, the coiler continuously drawing the knotted line under tension from the primary hauler and thrusting it in a straight path downwardly and generally centrally into the coiling enclosure.

A more specific object is to devise such a hauler and coiler system in which the knots and splices that often occur or are required in these lines, including the large knot by which the polypropylene and nylon sections are joined, can be readily accommodated at very high hauling speeds without disrupting the continuously efficient engagement of the feed rolls with the line, the smoothness of coiling, and without causing shock damage to the equipment. A further object is to provide a Crab Lay line coiler efficiently operable at higher speeds than prior art coilers for a similar purpose.

BRIEF DESCRIPTION OF THE INVENTION

In accordance with this invention, the knotted Crab Lay line drawn from the primary hauler passes over an upper guide sheave that assumes its tension load and runs in a generally straight stretch downwardly for a short distance into the underlying nip between feed rollers. One of these rollers is power driven and carries a pneumatic tire that cooperates with an opposing grooved roller to tractionally engage the line and, together with the substantial mass of this roller and its associated parts, helps cushion the system against abrupt shocks that the passage of knots can produce. As mentioned, the other feed roller is peripherally grooved to accommodate the line and the tire of this power driven roller. Retractably mounted and yieldably spring pressed against the tire nested in its groove, this lightweight roller is also serviently yieldable in a horizontal direction in response to passing line knots. The cooperating different yieldability characteristics of the opposing feed rollers, serving to maintain a continuously effective tractional grip on the knotted line to thrust the descending stretch of line downwardly in a continuously smooth feed at a central location into the receiving enclosure, together with the special characteristics of the Crab Lay type of line used, form orderly coils without necessity for any other guiding means or the use of line slingers as in prior art devices. The enclosure has a hinged side panel that can be opened to remove the coiled line and make room, if necessary, for more of the oncoming line continuing therefrom during a haul.

These and other features, objects and advantages of the invention will become more fully evident from the following description by reference to the accompanying drawings.

BRIEF DESCRIPTION OF THE DRAWINGS

FIG. 1 is an elevation veiw of a line hauling and coiling system utilizing the invention, the view picturing the apparatus in a direction fore-and-aft of a fishing vessel shown fragmentarily in simplified section.

FIG. 2 is a perspective view of the line coiling apparatus of this invention on a larger scale than that used in FIG. 1.

FIG. 3 is a perspective view of the line coiling apparatus of this invention seen from a different aspect and with the hinged sidewall of the line coiling tub opened and the coiled line removed therefrom.

FIG. 4 is an operating elevation view of the guide sheave and drive rollers with a knotted portion of line passing the latter. FIG. 4a is a fragmentary sectional view taken on line 4a—4a in FIG. 4.

DETAILED DESCRIPTION WITH REFERENCE TO DRAWINGS

As illustrated, the line coiling apparatus 10 operates in conjunction with a power driven hauling block 12. The hauling block 12 in this example is suspended from a davit 14 projecting outwardly from a location above the rail of the fishing vessel V. The coiling apparatus 10 is mounted on the deck of the vessel at some convenient location to receive the pot warp line as it comes aboard directly from the hauling block 12. In the illustration, the coiling apparatus is mounted on deck closely adjacent the davit 14. However, it could be mounted as well at a midships position, for example, or at the opposite side of the vessel if desired. In a transverse midposition it could be mounted to revolve through 180° or more so as to be addressed similarly to hauling blocks at any of different stations on either side of the vessel. Coiler location then is largely a matter of choice, as those skilled in the art will recognize from an understanding of the disclosure as a whole.

While the hauling mechanism used in association with the coiling mechanism of this invention may vary, the hauling block in this case comprises a base frame 12a suspended by a swivel eye 12b from the davit 14. A power driven sheave 12c having a deep re-entrant V-groove wedgingly receives the pot line L and in this way develops the necessary hauling traction thereon. The sheave 12c is suitably connected to be rotated by a drive source such as a hydraulic motor (not shown) in well-known manner. Fairlead sheaves 12d and 12e are located at the lower corners of the block frame 12a and serve to lead the pot line L to and from the drive sheave 12c so as to establish the required wrap angle around the drive sheave. Keeper rollers 12f help maintain the approaching line engaged in the leader sheave 12d.

A fluid type shock absorber of the telescoping piston and cylinder type 12g is connected at one end by a universal pivot joint 12h to the upright side of the davit 14 and at its other end by a pinned clevis joint 12i to the adjacent side of the hauling block frame 12a. This connecting strut or shock absorber stabilizes the hauling block while allowing it the necessary freedom of motion so as to maintain it properly addressed to the incoming line and at the same time maintain the desired degree of alignment between the hauling block and the associated coiling apparatus 10. The clevis joint 12i requires the hauling block frame 12a and the shock absorber strut 12g to pivot as a unit about the universal joint 12h and the suspension eye 12b. There will be some tendency for the stretch of fishing line L that extends between the coiling apparatus and the hauling block to swing in a horizontal direction as the block is caused to swing by changes in the direction in which the line L approaches the block during the course of a haul. However, the amount of change in direction of approach of the line to the coiling apparatus potentially thus incurred is not excessive, and should it become so an intermediate guide means (not shown) may be employed to assure proper lead-in of the line to the coiling apparatus.

The coiling apparatus 10 comprising this invention receives the crab pot line L first on an upper guide sheave 16. This guide sheave is rotatively mounted on the upper end of a stationary support arm 18, the sheave turning on a horizontal support shaft 20 that projects laterally from the side of the arm. The mounting arm 18 in turn joins a base bar 22 that extends horizontally across a minor chord of an upward-opening circular tubular enclosure comprising line coiling tub or enclosure 24. Posts 26 and 28 that carry the base bar 22 in this position above the tub are supported by ears 26a and 28a, respectively, fixed on the outer wall of the tub. The enclosure is formed in two mutually complemental arcuate wall sections. One supports the frame structure described and itself is secured to the boat deck by bolts passed into the deck through base flange apertures 30. The other wall section 24a is hinged to the first at 24b so as to permit opening and closing the tub for removing line coils C from the tub when the coils are complete.

The guide sheave 16 is so positioned in overlying relation to the enclosure 24 that line L passing over the guide sheave and extending directly downward therefrom lies approximately on the vertical central axis of the open cylindrical enclosure. This is as shown in FIGS. 1, 2 and 4. This downwardly extending stretch of line L passes from the sheave 16 into the nip between the opposing drive rollers 40 and 42. The latter are mounted to rotate on axes that are parallel to the rotational axis of guide sheave 16 and that lie substantially in a common horizontal plane above the line receiving tub 24. Drive roller 40 is power driven by hydraulic motor 44 mounted on the lower portion of the stationary frame arm 18. Drive roller 40 carries a pneumatically inflated rubber tire 40a that is inflated to a pressure of the order of 10 to 15 pounds per square inch and, in fact, this drive roller may comprise a small vehicle wheel such as the wheel of a small automobile, boat trailer, etc.

Drive roller 42 is mounted to turn freely on a shaft 42a projecting laterally from a hinged support arm 46, with the midplane of the roller 42 common to the midplane of drive roller 40. Support arm 54 is hinged at 54a on the shaft 20 that carries guide sheave 16 and normally hangs substantially vertically from that support (FIG. 4). An elongated helical spring 48 secured at one end to the support shaft for drive roller 42 extends upwardly at an incline therefrom to attach to the eye of bolt 50 passed through an aperture in the upper web of frame arm 18. A wing nut 52 on this bolt can be turned one way or the other to increase or decrease the tension force in spring 48 and thereby vary the pressure exerted in a generally horizontal direction by the drive roller 42 against the periphery of drive roller 40. Typically this pressure is set at approximately 50 pounds. With the line L clamped by this pressure in the nip between the opposing drive rollers as shown in FIG. 4, adequate drive traction to feed the line downwardly is gained by the rubber-tired feed roller 40 so as to thrust the line L in continuous manner downwardly along the central axis of the guide tube 24 as fast as the line is hauled in by block 12.

Drive roller 42 has a peripherally extending outer rim grooved to accommodate and guide the line and line knots and to be entered by the rim of the tire 40a on drive roller 40 in nested relationship. Preferably the peripheral groove of roller 40 has a slight central valley or depression helping to keep the line centered in the groove (FIG. 4a).

It will be observed that the drive roller 40, together with its hydraulic motor 44, tire 40a and associated parts, constitute a relatively heavy mass. This drive roller and its associated components are stationarily mounted on the frame arm 18. Because of this heavy mass and the soft cushioning effect of pneumatic tire 40a (FIG. 4a) cooperating with yieldability of the spring actuated opposing roller of relatively small mass, the bulky and hard line knots $L_k$ that pass rapidly through the nip between the rollers impose comparatively little shock on the support apparatus. Moreover, they pass with little or no dislodging tendency of the line in relation to the drive rollers, thereby assuring continuity of feed effort applied to the knotted line.

As indicated above, the roller 42 on the other hand, is preferably of lightweight construction and mounted on a lightweight arm 42. Their combined mass should be kept small by comparison with that of the assembly associated with roller 40. Consequently the retractable drive roller 42 will yield responsively as required to the reaction pressure produced by the wedging effect of the knot passing through the roller and thereby complement the yieldability of the opposing tire in minimizing apparatus shock and disruption of continuously efficient driving pressure applied to the knotted line throughout making a haul. Easy retractability of the arm-mounted roller 42 permits an operator to insert and remove lines readily between the rollers without necessity of endwise threading of the line between them.

It will be noted that the downwardly extending stretch of line L that passes through the nip between the drive rollers 40 and 42 approaches the latter from an overlying point of beginning at guide sheave 16 that is set some distance, such as a foot or so, above the guide roller nip. The freely laterally deflectable stretch of line leading to and from the drive rollers aids the shock absorbing action afforded by the yieldability of the pneumatic tire on roller 40 and of the support arm 46 for roller 42 in cushioning shocks and maintaining continuously efficient line driving engagement by the feed rollers.

In operation, incoming Crab Lay line L hauled by the main hauling block 12 at the desired hauling rate, such as of the order of several hundred feet per minute, is drawn steadily from the block by the applied torque of drive roller 40 turned by hydraulic motor 44. Hydraulic motor 44 is suitably operated by hydraulic control circuits under hydraulic pressure from a supply source not shown, but of any suitable or conventional design. Also preferably incorporated in these hydraulic circuits may be a conventional pressure relief valve incorporated in a shunt across the terminals of motor 44. The valve is set to relieve at a predetermined pressure such that the torque exerted by the drive roller 40 has a maximum safe limit preventing application of excessive pulling force to the line in the event operation of the hauling block is stopped with motor 44 still energized.

The drive rollers 40 and 42, largely spared from line tension variations by the presence and relative location of guide roller 16, are thus enabled to thrust the incoming Crab Lay pot line L downwardly at a continuous rate generally along the central vertical axis of the receiving tub 24 matching the rate at which the hauling block 12 itself brings it aboard the vessel. The improved coiler of this invention is enabled to coil the line even at faster rates than were achieved in the most recent prior art devices relying on line slingers, such as in U.S. Pat. No. 3,750,790. With the line guided by sheave 16 into the nip of the rollers along a downwardly descending path substantially in coincidence with the path along which it departs from the drive rollers (i.e., substantially the vertical axis of the enclosure 24) it is found that this stiff Crab Lay line can be force fed as a bendable column down into the enclosure even at the very high hauling rates often employed, and that despite its stiffness it will coil in an orderly fashion within the interior of the receiving enclosure 24 as fast as it enters through the central region thereof without necessity for any guiding or restraining device, even to get the coiling started. This automatic coiling action, achieved without aid of a line slinger or special guides, is attributable to the combined interaction of the special characteristics of Crab Lay line and the cooperating feed rollers centered over the enclosure 24. Also it is uninhibited by line knots and by the running transition from top section (nylon or polypropylene-dacron) to bottom section (polypropylene) of line materials making up the pot warp. Such coiling action is not realized with ordinary lay or general-purpose lines of the same or similar materials. By dispensing with rotating line slingers or special guides and other complicating mechanisms, a low-cost, durable, maintenance free and relatively safe and compact device is achieved. The apparatus, of course, obviates any requirement for a storage reel or spool as a coiling implement. While the successive coils thus being formed at any time by the apparatus fall in somewhat random patterns in terms of changing diameters and locations in the composite coil, the resultant configuration proves to be sufficiently orderly to satisfy the practical requirements of compact storage of line and subsequent dispensing without tangling when line is pulled from the coil in making subsequent sets of the crab pots.

These and other aspects of the invention will be evident to those skilled in the art, including detailed changes or design modifications varying from the illustrated embodiment that may be made within the scope thereof as defined in the claims that follow.

The embodiments of the invention in which an exclusive property or privilege is claimed are defined as follows:

1. In crab pot hauling and handling aboard a fishing vessel using a powered pot line hauler operable to haul in the crab pot in a substantially continuous haul after the floats are first brought on deck, continuous line coiler apparatus mountable on deck and into operable engagement with which a portion of the incoming line connected to the floats grasped by a crewman may be laterally inserted to initiate coiler apparatus operation without hauler interruption, said coiler apparatus comprising an upright generally annular coil-forming enclosure having an open top adapted to receive pot line fed downwardly into the same, mutually opposing substantially coplanar drive rollers, means mounting said rollers from one side thereof to form a downwardly directed line-engaging nip open to the opposite side of the rollers to permit lateral insertion and removal of a line therein, at least one such drive roller being power driven in a direction to continuously draw the incoming line from the hauler and to thrust the line directly downward generally centrally into said enclosure, thereby inherently to coil the line in such enclosure substantially without intervening physical line guidance, resiliently yieldable means operatively associated with the drive rollers to effect compression of the line between their mutually opposing nip surfaces with a force establishing drive traction on the line and with a degree of resilient yieldability that substantially absorbs the shock of line knots passing through the nip, and means operatively associated with said drive rollers tending to maintain the line, including line knots, transversely centered in said nip, including line guide means also laterally engageable and disengageable by the line in conjunction with lateral insertion and removal, respectively, of the line in relation to the drive rollers nip, said line guide means being mounted above said drive rollers in position to direct incoming line received from the hauler directly downwardly into the nip substantially in the plane of said drive rollers.

2. The apparatus defined in claim 1 wherein the line guide means comprises a roller with a reentrant line-receiving groove peripheral therein coplanar with the drive rollers, and the power driven drive roller carries a pneumatically inflated rubber-like tire bearing against the opposing drive roller, and wherein such opposing drive roller has a peripherally extending groove in which the tire nests and rides, pressing the line against the base of such groove.

3. The apparatus defined in claim 2 wherein the groove in the opposing drive roller has a reentrancy in the bottom thereof tending to center the line therein.

4. The apparatus defined in claim 2, including a horizontally movable support for said opposing drive roller, including resilient means urging such opposing drive roller yieldably against the power driven drive roller, said support being retractable to permit direct insertion and removal of lines between the guide rollers.

5. The apparatus defined in claim 4 wherein the enclosure comprises an upright substantially circular tubular enclosure wall including an arcuately extending fixed portion adapted to be anchored to a stationary support and a complemental arcuately extending portion on the side thereof corresponding to said opposite side of the drive rollers that can be separated from said fixed portion to open the enclosure for removal of a pile of coiled line therefrom.

6. The apparatus defined in claim 5 comprising base means joined to the fixed portion of the upwardly open tubular wall enclosure including an arm member inclined upwardly therefrom and across its opening in a vertical plane extending along a minor chord thereof, the guide means comprising a line guide sheave freely rotatable on a shaft mounted on the arm member to position the guide sheave with the vertical central axis of said tubular enclosure substantially tangent to the sheave's periphery, the power driven roller being also mounted on the base means at a lower level than the guide sheave with said vertical central axis substantially tangent to the periphery of such power driven roller, and wherein the opposing drive roller is freely rotatable on a shaft mounted on the lower end of a generally upright support member, said generally upright support member being mounted to swing by its upper end on the arm member about a horizontal axis parallel to the rotation axes of the drive rollers, and spring means acting on said upright support member to force said opposing drive roller aginst the power driven drive roller.

7. The apparatus defined in claim 1 including a horizontally movable support for said opposing drive roller including resilient means urging such opposing drive roller yieldably against the power driven drive roller, said support being retractable to permit direct insertion and removal of lines laterally of such lines between the guide rollers.

8. The apparatus defined in claim 1 wherein the enclosure comprises an upright circular tubular wall including an arcuately extending fixed portion adapted to be fixed upon a stationary platform and a complemental arcuately extending portion on the side thereof corresponding to said opposite side of the drive rollers that can be separated from said fixed portion to open the enclosure for removal of coiled line therefrom.

* * * * *